(12) United States Patent
Orlando et al.

(10) Patent No.: US 6,624,363 B2
(45) Date of Patent: Sep. 23, 2003

(54) BULK MATERIAL TRAILER (76) Inventors: Franklin P. Orlando, 14625 Country La., Morgan Hill, CA (US) 95037; Phillip Ray Scott, 29486 Corral Ct. North, Coarse Gold, CA (US) 93614

( * ) Notice: Subject to any disclaimer, the term of this patent is extended or adjusted under 35 U.S.C. 154(b) by 134 days.

(21) Appl. No.: 09/922,195

(22) Filed: Aug. 2, 2001

(65) Prior Publication Data

US 2003/0024746 A1 Feb. 6, 2003

(51) Int. Cl.$^7$ .......................... G01G 19/08; A01D 46/00
(52) U.S. Cl. ...................... 177/136; 177/139; 56/328.1
(58) Field of Search ................................ 177/136–141; 56/202, 228, 328.1

(56) References Cited

U.S. PATENT DOCUMENTS

| | | | | |
|---|---|---|---|---|
| 3,363,707 A | * | 1/1968 | Murray et al. | 177/136 |
| 3,695,213 A | * | 10/1972 | Littlefield | 177/136 |
| 3,700,053 A | * | 10/1972 | Glissendorf | 177/136 |
| 3,780,817 A | * | 12/1973 | Videon | 177/136 |
| 3,797,594 A | * | 3/1974 | Chaffee | 177/136 |
| 3,857,452 A | * | 12/1974 | Hartman | 177/136 |
| 3,971,451 A | * | 7/1976 | Norberg | 177/136 |
| 4,281,729 A | * | 8/1981 | Farley et al. | 177/139 |
| 4,359,099 A | * | 11/1982 | Henslin | 177/140 |
| 4,362,097 A | * | 12/1982 | Rogers | 177/136 |
| 4,411,325 A | * | 10/1983 | Hamilton | 177/136 |
| 4,635,739 A | * | 1/1987 | Foley et al. | 177/141 |
| 4,792,004 A | * | 12/1988 | Sheffield | 177/141 |
| 4,852,674 A | * | 8/1989 | Gudat | 177/141 |
| 5,677,498 A | * | 10/1997 | Oakes et al. | 177/136 |
| 6,013,880 A | * | 1/2000 | McFarlane et al. | 177/139 |
| 6,066,809 A | * | 5/2000 | Campbell et al. | 177/136 |
| 6,150,617 A | * | 11/2000 | Hart et al. | 177/136 |
| 6,396,003 B1 | * | 5/2002 | Friesen | 177/136 |

FOREIGN PATENT DOCUMENTS

JP          59-176133     * 10/1984 ................. 177/136

* cited by examiner

Primary Examiner—Randy Gibson
(74) Attorney, Agent, or Firm—Henry M. Stanley (57) ABSTRACT An improved gondola assembly for receiving harvested crops in the field from a crop harvester has a lightweight molded drop in tank held in place by a tank framework on the gondola assembly. The drop in tank lowers the gondola center of gravity as it replaces stainless steel or painted mild steel tanks and requires no periodic maintenance. A built in scale for continuous in the field monitoring of the weight of received harvested crop is constructed to be viewable by a tow tractor operator whether towed from one end of the gondola or the other. The towable gondola obtains power for operation of a pair of tank framework lift cylinders from the tow tractor so that the tank is movable between an elevated dump position and a lowered crop collection position. The gondola has a reversible towing tongue for towing in either direction so it may be configured to be towed on either side of a crop harvester.

28 Claims, 8 Drawing Sheets fig-1B fig_8 fig_9 fig_10 fig_11A fig_11B fig_12A fig_12B

BULK MATERIAL TRAILER

BACKGROUND OF THE INVENTION

Farmers use bulk material trailers, referred to as "gondolas", to transport harvested crops, such as grapes, from a field harvester to the edge of the field. The gondolas are then dumped into tanks on highway traveling trailers for transport to a processing facility, such as a winery. The gondola consists of an open top tank mounted on a trailer that has a tongue used to connect the trailer to a towing tractor. The gondola is also referred to as a bulk material trailer. The tractor tows the gondola alongside a crop harvester, having a crop dispensing conveyer that directs the harvested crop into the open top in the gondola. Such a gondola for harvesting wine grapes typically holds five to seven tons of grapes when it is filled. After the gondola is filled, the tractor tows it alongside the highway traveling trailer and the gondola is pivoted about a point on the crop collection trailer until the harvested contents are dumped into the highway traveling trailer. To provide clearance for dumping the harvested crop into the highway-traveling trailer the gondola pivot point is necessarily a considerable distance off of the ground and to one side of the gondola trailer. The gondola-towing tractor provides power, typically hydraulic power, for positioning the crop collection tank thereon between a lowered crop collecting position and a raised dumping position.

Current gondola designs tend to tip during the dumping process, because of the necessity for lifting the crop collection tank to a position six to seven feet above the ground and thereafter dumping the collected crop over the side of the bulk material trailer. Currently, stainless steel and painted mild steel tanks are used to collect crops. Mild steel tanks tend to rust because the collected crops, such as wine grapes, can be acidic. Further, stainless steel tanks are quite expensive, difficult to fabricate and also difficult to repair. Painted, mild steel tanks need to be stripped of their paint and repainted approximately every four to six years. This is also an expensive process.

Highway traveling trailers must have controlled transport weight. If the highway traveling trailer is under loaded, money is lost in the transport phase of the process. If the highway traveling trailer is over loaded, the hauler towing the highway trailer is subject to fines and delays at highway weight checkpoints. Simply controlling the fill volume in the highway traveling trailer is not an accurate way to control the weight of the crop being hauled, because crop weight per unit volume varies widely. With many crops, such as grapes, the water and sugar content of the crop varies. Scales in the field are not a practical solution, because harvesting takes place over such wide areas of farmland and because most scales for weighing heavy weights are not transportable.

SUMMARY OF THE INVENTION

This invention relates to a mobile gondola assembly for receiving a harvested crop wherein the gondola assembly includes a removable tank having an open top, a tank support framework for carrying the removable tank, and means for defining a pivot axis on the tank support framework. A mobile trailer is also provided for receiving and supporting the tank support framework for rotation about the pivot axis. Means is mounted between the trailer and the tank support framework for moving the tank support framework about the pivot axis between a raised dumping position and a lowered crop receiving position. Further, means is provided for continuously measuring the weight of the harvested crop in the removable tank in the lowered crop receiving position.

In another aspect of the invention a towable gondola assembly for receiving a crop as the crop is harvested includes a thin walled crop receiving tank having an open top and a framework for supporting and holding the thin walled crop receiving tank. A trailer is configured to support the framework for movement over an underlying surface and means is disposed between the trailer and the framework for pivotally supporting the framework for movement about the pivot axis. Further, means is provided for moving the framework about the pivot axis between a raised dumping position and a lowered crop receiving position. The means for moving has one end thereof floating relative to the pivot axis. Additionally, a scale is provided for indicating the weight of the crop within the receiving tank in the lowered crop receiving position.

In yet another aspect of the invention a towable gondola assembly for collecting a crop from a crop harvester as the crop is harvested includes a lightweight thin wall crop collecting vessel having an open top and a framework for securely holding and supporting the lightweight thin wall vessel. A trailer supports the framework. Means is provided for mounting the framework on the trailer for pivoting movement about a pivot axis. Means is also provided for moving the framework about the pivot axis between an elevated crop dump position and a lowered crop collecting position. The means for moving has one end thereof floating in the crop collecting position relative to the pivot axis. Additionally, means is provided for sensing and indicating the weight of the collected crop in the lowered crop collecting position during crop collection so that known weight of harvested crop is transferred when the framework is elevated to the dump position.

The invention includes a method of collecting a harvested crop from a crop harvester wherein the steps of towing a crop collection gondola along one side of the crop harvester and pivoting a removable open top tank about a pivot axis to a lowered crop collection position are included. The step of collecting the harvested crop in the removable open top tank is performed while the tank is in the lowered collecting position. The removable open top tank is floated relative to the gondola pivot axis during crop collection and the weight of the collected crop is continuously monitored as it is deposited into the removable tank. The removable tank is then raised about the pivot axis to a raised dump position for transferring the collected crop after obtaining a predetermined weight of crop.

In another aspect of the invention a crop collection gondola assembly for receiving a crop in the field from a crop harvester includes a tank having an open top and a tank support framework for receiving the tank. Further, a mobile trailer is included for carrying the tank support framework and means is provided for moving the tank support framework between a crop collection position and a crop dumping position. The means for moving assumes a floating condition in the crop collection position. Additionally, a weight measuring means is included for providing in the field measurement of weight of received crop within the tank.

A crop collection gondola for receiving crops in the field from a crop harvester has a mobile trailer and a crop receiving tank mounted for pivotal movement on the mobile trailer. Means is provided for pivoting the crop receiving tank between a crop collection position and a crop dumping position. Weight measuring means is disposed between the mobile trailer and the crop receiving tank for providing in the field measurement of the weight of received crop in the tank.

DESCRIPTION OF THE PREFERRED EMBODIMENTS

Figures 1A, 5B, 5C, 5D:
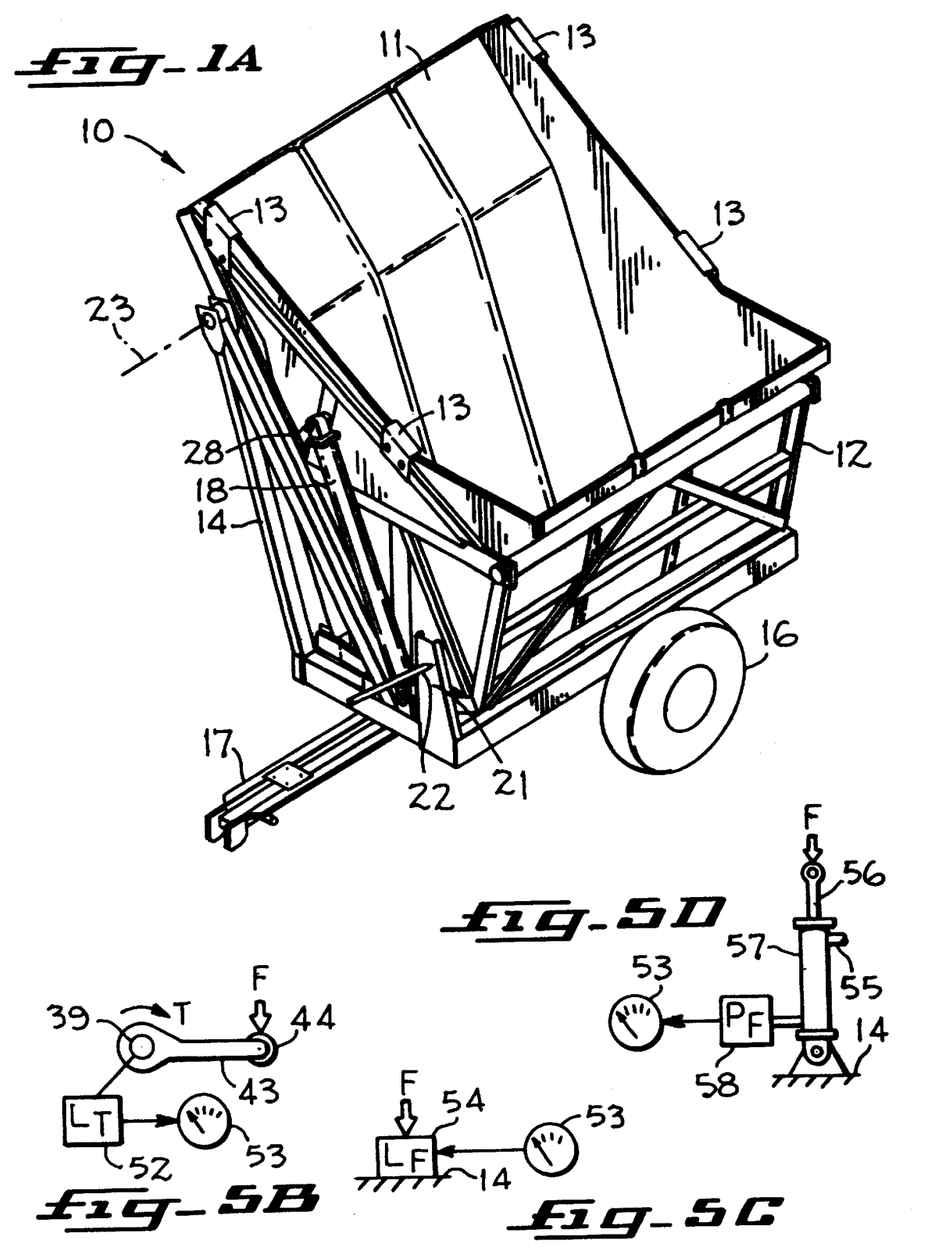
FIG. 1A is a perspective of one embodiment of the crop collection gondola of the present invention.
FIG. 5B is a diagram of a mechanical weight measuring structure.
FIG. 5C is a diagram of an electrical weight measuring structure.
FIG. 5D is a diagram of a hydraulic weight measuring structure.

With reference to FIG. 1A in the drawings a gondola assembly incorporating the present invention is shown generally at 10. A molded, drop-in tank 11 is held in a tank support weldment 12, wherein the tank 11 is held within the weldment 12 by means of a number of clips 13. A trailer frame 14 is seen in FIG. 1A having a pair of wheels 16 (one shown) attached by an axle (not shown in FIG. 1A). A tongue 17 extends forwardly from one end of the frame 14 having structure thereon adapting it for connection to a towing tractor (not shown). A hydraulic lift cylinder 18 is shown in FIG. 1A at the forward end of the trailer frame 14 as depicted in the Figure. A second lift cylinder 19 (FIG. 4) is not visible in FIG. 1A, but is mounted in a fashion similar to that shown for lift cylinder 18. The lift cylinders 18 and 19 are not referred to as forward and rearward lift cylinders, because the tongue 17 may be removed and reassembled on the opposing end of the trailer frame 14 as will be hereinafter explained. An upstanding member 21 is attached to the frame 14 for carrying a weight scale as will also be hereinafter described. A scale pointer 22 shown in FIG. 1A and is used in one embodiment of the structure described herein for measuring weight contained within the removable tank 11.

Figure 1B:
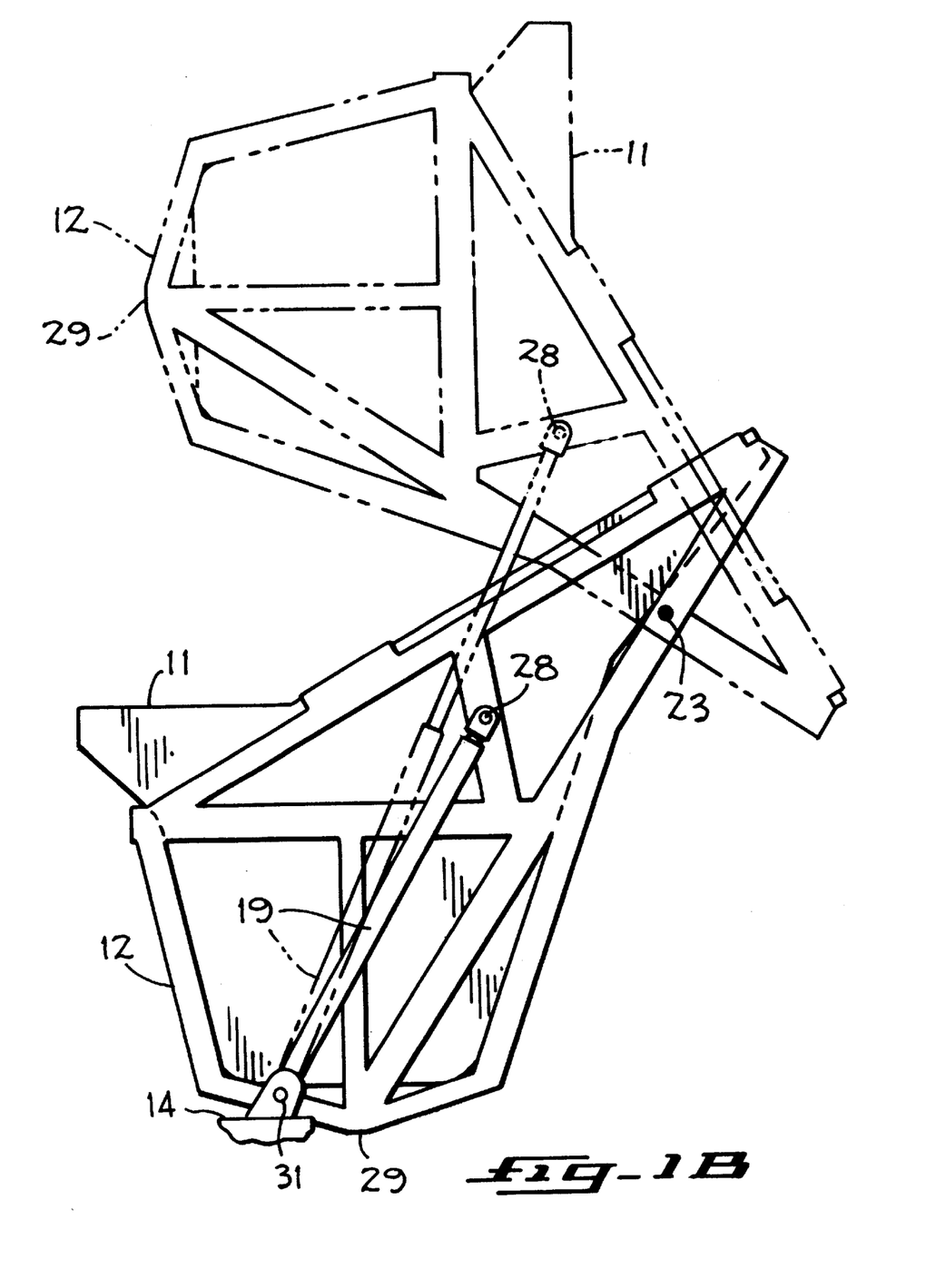
FIG. 1B is a partial view showing the crop collection gondola of the present invention in a crop collecting lowered position and a crop dumping raised position.

FIG. 1B shows the combination of the removable tank 11 and the tank support weldment 12 together with one of the lift cylinders 19. One end of the hydraulic lift cylinder 19 is pivotally attached to the trailer frame 14 (shown schematically in FIG. 1B) and the other end is pivotally attached to a point 28 on the tank support weldment 12 as shown. The combination of the removable tank 11 and the tank weldment 12 held together by the clips 13 is pivotable about a pivot axis 23 shown in both FIGS. 1A and 1B. Thus, the assembly of the removable tank and the tank support weldment is pivotable about the axis 23 relative to the frame 14 by extension of the hydraulic lift cylinder 19 (in conjunction with lift cylinder 18) which places the combination tank and weldment in a raised dump position as shown in ghost line in FIG. 1B. The solid line depiction in FIG. 1B of the tank and weldment is shown in the lowered crop collection position.

Figures 2, 3:
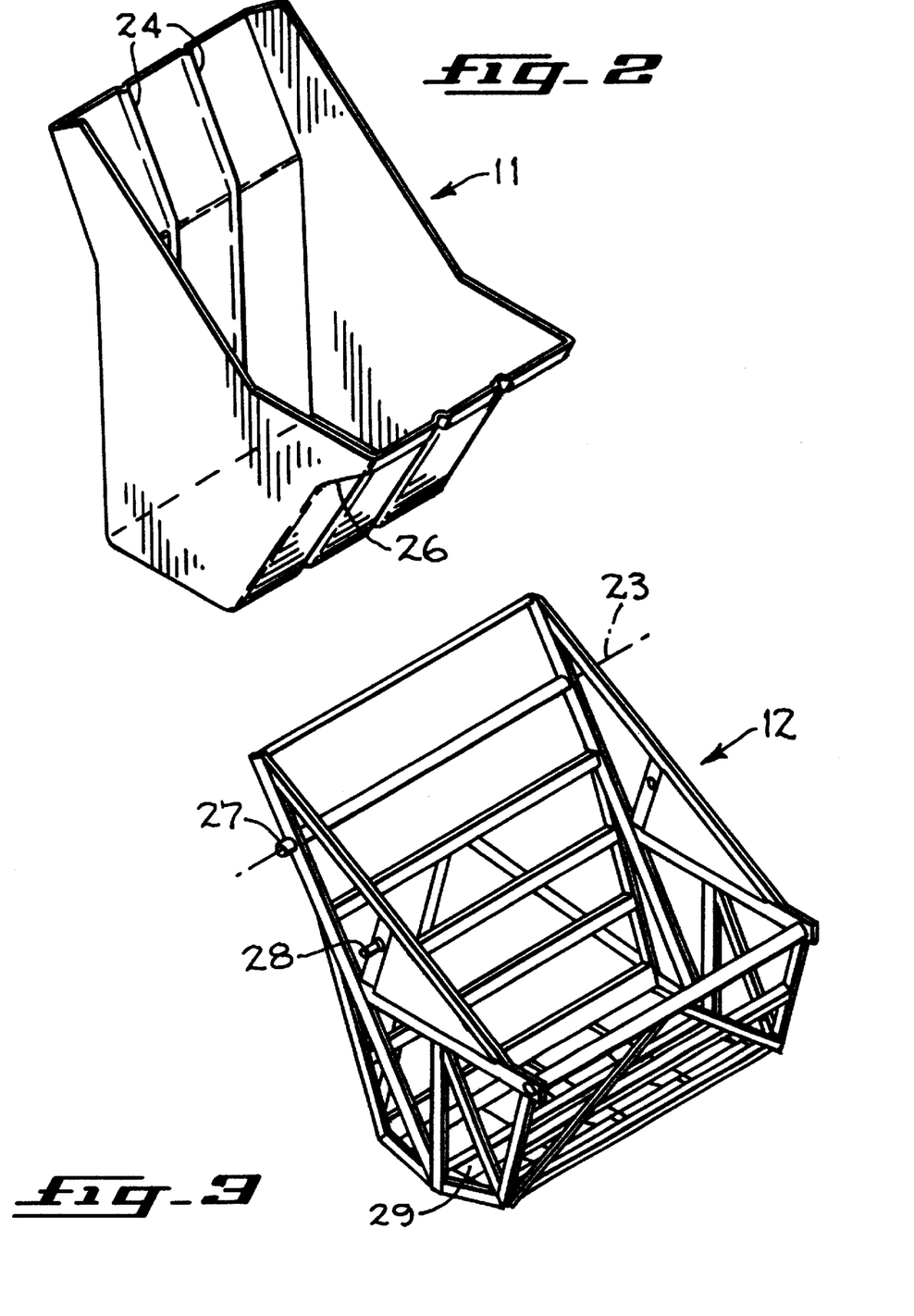
FIG. 2 is a perspective of a crop collection tank used in the present invention.
FIG. 3 is a perspective of a tank support framework used in the present invention.

FIG. 2 illustrates the removable or drop-in tank 11. The drop-in tank is fabricated from high density polyethylene material and has a relatively thin tank wall in the range of $3/16$ to $3/8$ of an inch in a preferred embodiment. The removable or drop-in tank 11 is therefore of relatively light weight, but too flimsy to support by itself the weight of collected crop loads envisioned by this invention. The removable tank has a pair of reinforcing ribs 24 extending from an upper edge through the bottom and continuing to an opposite upper edge of the tank. The portions of the ribs 24 that are hidden from view by the structure of the tank 11 are shown in hidden line throughout the contour of the tank from upper edge to opposite upper edge. A lip portion 26 is shown on the tank 11 for enlarging the upper opening shown in the tank of FIG. 2. The higher edge of the tank shown toward the left side of the depiction of FIG. 2 is the edge of the tank over which a collected crop is dumped following collection of a predetermined weight of harvested crop in the field.

FIG. 3 shows the tank support weldment 12 having a pivot 27 (one shown) on each side thereof on the pivot axis 23. Further, the tank support weldment 12 has the additional pivots 28 (one shown) mentioned in conjunction with FIG. 1B on each side thereof. The pivots 28 serve as attachment points for the upper ends of the hydraulic lift cylinders 18 and 19. A main spar 29 runs across the bottom of the tank support weldment serving as the lowermost member of the weldment for purposes to be hereinafter described in conjunction with the weight measuring feature of the present invention. The remainder of the tank support weldment is configured with an array of stress absorbing cross members and braces to properly support the aforementioned relatively flimsy removable tank 11 shown in FIG. 2.

Figures 4, 5A:
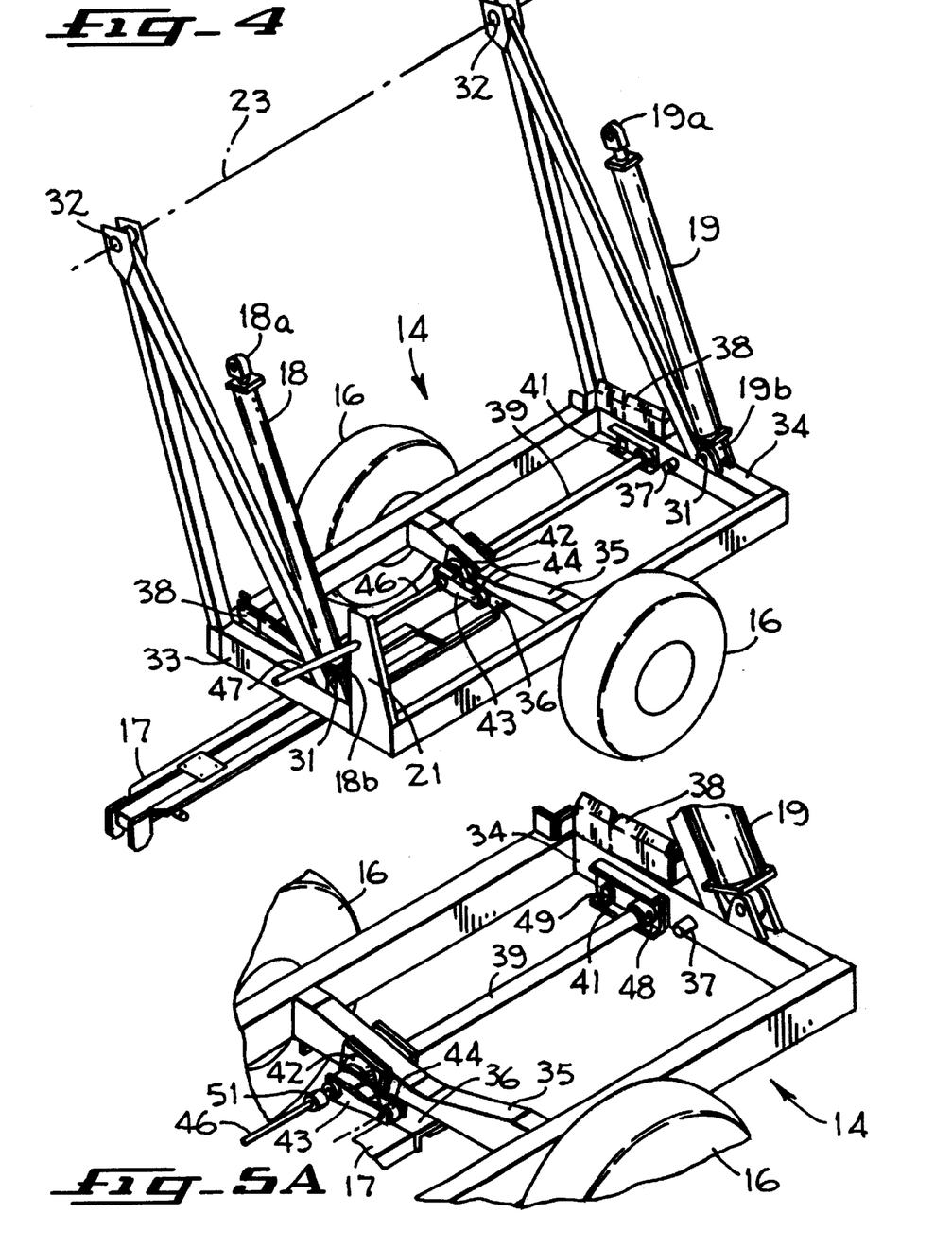
FIG. 4 is a perspective of a mobile trailer used in the present invention.
FIG. 5A is a partial view of the mobile trailer of FIG. 4 depicting details of a mechanical weight measuring structure.

Turning now to FIG. 4, the trailer frame 14 is shown, with hydraulic lift members 18 and 19 thereon. An upper end 18a and 19a on the two hydraulic lift cylinders is configured to be engaged at the pivots 28 on the tank support weldment 12 described previously. Lower ends 18b and 19b on the hydraulic lift cylinders 18 and 19 respectively, are engaged by pivots 31 situated on the trailer frame. Pivot axis 23 is shown in FIG. 4 extending through receiving holes 32 on opposing ends of the trailer frame 14. The receiving holes 32 receive the pivots 27 on the tank support weldment 12 so that the weldment and the removable tank combination rotates about the pivot axis 23 relative to the trailer frame 14 when hydraulic lift members 18 and 19 are operated as shown in FIG. 1B. The trailer frame has a left end member 33 as seen in FIG. 4 on one end of the frame and a right end member 34. The tongue member 17 is shown extending away from the frame, bolted to the underside of the left end member 33 and having a fixed end attached by appropriate means to a tongue holding bracket 36 that is fixed to a central cross member 35 in the trailer frame. The tongue member 17 may be released from trailer 14 by removing the bolts attaching it to the underside of end member 13 and the fasteners attaching it to towing tongue bracket 36 and reversing the extension of the towing tongue member 17 so that it assumes a position similar to that of FIG. 4, but extending outwardly from the right side of the trailer frame as seen in the Figure. This is accomplished by bolting the towing tongue member 17 to the underside of the end member 34 of FIG. 4 and then fixing the inner end of the towing tongue to the towing tongue bracket 36. The purpose of this reversal of the extension direction of the towing tongue member is so that the trailer frame 14 can be towed in one direction or in the opposite direction for purposes to be described hereinafter.

It should be noted that a stop 37 protrudes from the end member 34 as shown. A similar stop member 34 is fixed in the end member 33 also for purposes to be hereinafter described.

Guide members 38 are mounted on the end members 33 and 34 of the trailer frame to position the combination of the removable tank 11 and tank support weldment 12 on the trailer frame.

A torsion bar 39 is shown extending between the central cross member 35 on the trailer frame 14 and end member 34 in FIG. 4. The torsion bar 39 extends through a lever member 41 and is pinned to the lever member so that it cannot rotate relative thereto. The torsion bar extends through the lever member and into a hole (not shown) within the end member 34. The end of the lever member 41 opposite the end to which the torsion bar 39 is pinned is bolted to the end member 34. A flange bearing 42 is mounted in the central cross member 35 in the trailer frame and allows the torsion bar 39 to pass therethrough. The end of the torsion bar 39 within the flange bearing 42 is therefore free to rotate. Another lever arm 43 is fixed to the freely rotating end of the torsion bar 39 and extends laterally therefrom having a roller 44 at the end thereof. The free end of the torsion bar 39 has an extension rod 46 attached thereto that extends through a hole in end member 33. The end of the rod 46 that emerges toward the outside of the end member 33 has attached thereto a pointer 47 that sweeps across the scale plate 21 as rod 46 rotates about its long axis to provide a weight measurement in one embodiment to be described hereinafter.

Referring now to FIG. 5A, the structure previously described in conjunction with FIG. 4 is shown in a more detailed fashion. The stop 37 is shown extending from the inside surface of the end member 34 and one of the lower side guides 38 for positioning the combination of the removable tank 11 and tank support weldment 12 is shown attached to the upper surface of the cross member 34. Torsion bar 39 is shown engaged in one end of lever 41 by means of a previously mentioned pin 48. The end of the lever 41 spaced from the torsion bar 39 has a bolt 49 extending therethrough to attach that end of the lever arm to the end member 34 on the trailer frame. As previously described the torsion bar 39 extends through the lever 41 and through the end member 34 to be fixed rigidly (rotationally and axially) at that end. The opposing end of the torsion bar 39, as previously described, extends through the flange bearing 42 exposing an end that is free to rotate upon which is mounted the laterally extending lever 43. The roller 44 is more clearly seen in FIG. 5A at the free end of the lever 43. A coupling 51 attaches the rod 46 to the end of the torsion bar 49 so that torsional movement of the torsion bar 39 sweeps the pointer 47 across the scale face 21. The tongue holding bracket 36 is also seen in FIG. 5A affixed to the fixed end of the tongue member 17. The main spar 29 seen in FIGS. 1B and 3 contacts the roller 44 to induce torsion in the torsion bar 39 for weight measuring purposes to be hereinafter described.

Various ways of measuring weight continuously as a crop is deposited in the removable tank 11 are envisioned by the invention described herein. FIG. 5B displays diagrammatically the weight measuring configuration described in conjunction with FIGS. 4 and 5A. Weight in the removable tank 11 produces a force that is exerted by the main spar 29 in the tank support weldment 12 on the roller 44 positioned at the end of the lever 43, whereby torque is induced in the torsion bar 39. The torque is sensed either mechanically, as described in FIGS. 4 and 5A, or by strain gauges or the like 52 to produce a signal transmitted to a gauge 53 for indicating weight on the contained indicator scale. Alternatively, the force induced by the weight of a collected crop within the removable tank 11 induces a force transmitted by the lower spar 29 on the tank support weldment 12 that is transferred to a load cell 54 as seen in FIG. 5C. The load cell is mounted on the trailer frame 14 as seen in FIG. 5C and in turn produces a weight proportional output signal that is transmitted to the gauge 53 having a scale graduated in units of weight as described hereinbefore.

As illustrated in FIG. 5D, force induced by the weight of a collected crop within the removable tank 11 exerts a force on a piston rod 56 attached to the tank support weldment 12 at a free end and to an internal piston within a hydraulic cylinder 57 at the other end. The lower end of the cylinder 57 is attached to the trailer frame 14. The cylinder 57 is filled with fluid. The pressure produced by the force within the hydraulic fluid in the cylinder 57 is measured by a pressure transducer 58 that produces a signal connected to the aforementioned gauge 53 having a scale graduated in units of weight. It should be noted that the aforementioned methods of measuring the weight of the collected crop in the removable tank 11 depend on the support for the combination of the tank 11 and the tank support weldment 12 being in a floating condition while the tank and weldment combination is in the lowered crop collection position shown in solid lines in FIG. 1B.

Figure 7:
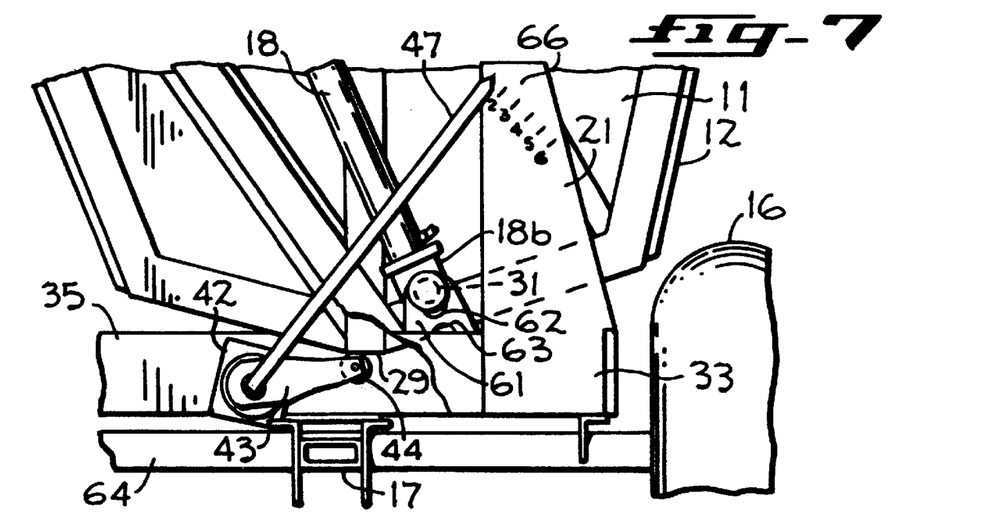
FIG. 7 is a detail view of the mechanical weight measurement structure.
Figure 8:
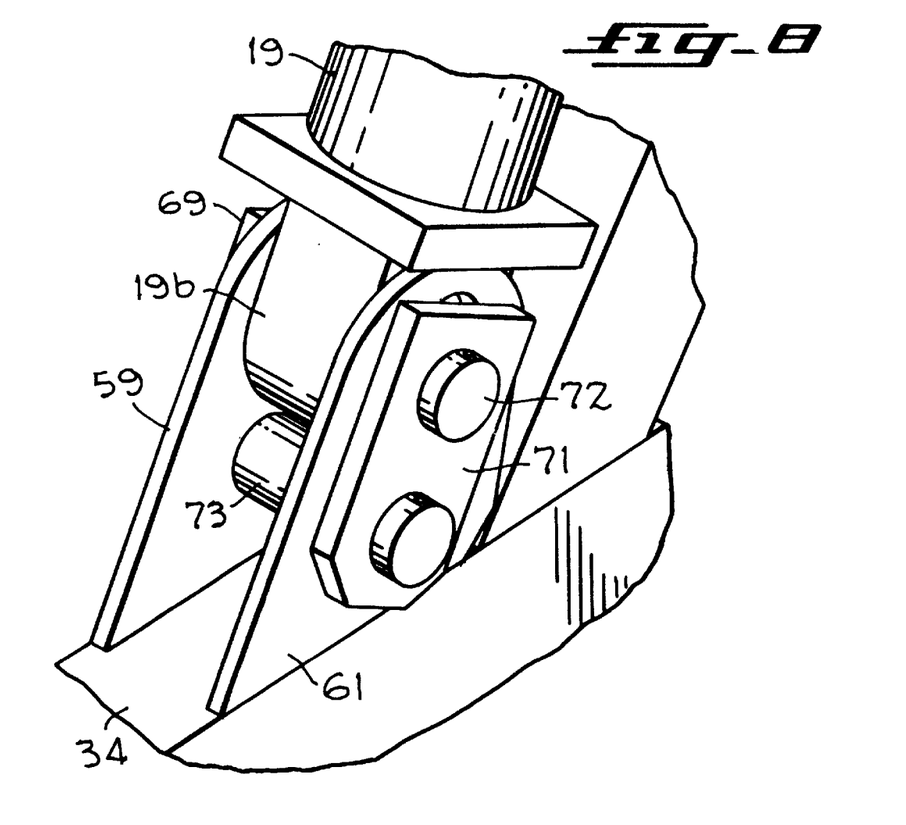
FIG. 8 is a detail showing a calibration fixture for the weight measuring structure of FIG. 7.

The manner in which the support for the combination of the collection tank and the tank support weldment is floated will be described by first referring to FIG. 7. The pivot pin 31, to which reference was made in the description of FIG. 4, is shown in FIG. 7 extending through a hole in the lower portion 18B of the hydraulic lift cylinder 18. A bracket member 61 is shown fixed as by welding to the upper surface of the end member 33 on the trailer frame 14. Turning briefly to FIG. 8, it is shown that the bracket member 61 is an outside bracket member and that a cooperating bracket member 59 is also fixed as by welding to the end member 33. The bracket members 61 and 59 shown in FIG. 8 are attached to the upper surface of the opposing end member 34 on the trailer frame. It is clear from the figures that the bracket members 61 and 59 mounted on the end members 33 and 34 are for the purpose of retaining the lower ends 18B and 19B of the hydraulic lift cylinders 18 and 19, respectively. A detail of the bracket member 61 is shown in FIG.

Figure 9:
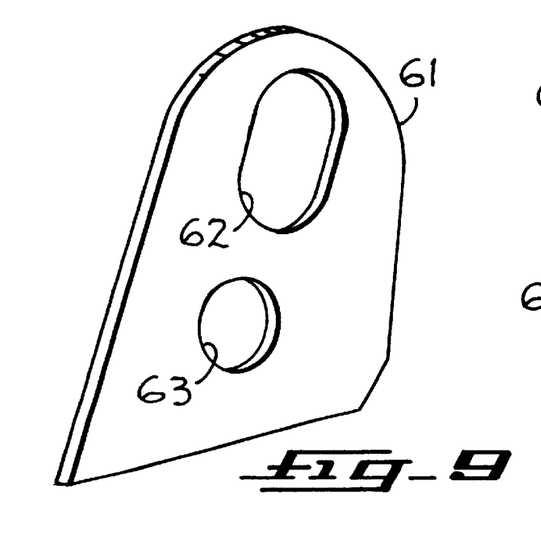
FIG. 9 is a detail showing a portion of the calibration fixture of FIG. 8.

9 wherein an elongated opening 62 is formed in an upper portion of the bracket and a round hole 63 is formed in a lower portion of the bracket. The base of the bracket as seen in FIG. 9 is, as mentioned hereinbefore, fastened as by welding to the upper surface of each of the end members 33 and 34 on the trailer frame. Bracket members 59 and 61 are formed identically.

FIG. 7 also shows an axle 64 extending beneath the center frame member 35 between the round engaging wheels 16. End member 33 in FIG. 7 is cut away to the left of the cylinder bracket member 61 so that central cross member 35 on the trailer frame is visible. As a consequence, the lever 43 having roller 44 on the end thereof, is shown wherein the roller 44 is bearing against the main spar 29 on the tank support weldment 12. The pointer 47 on the end of extension rod 46 may be seen to move with the lever 43 as torsion rod 39 is subjected to more or less torque as the weight of a collected crop within the removable tank 11 produces force through the main spar 29 against the roller 44 on the lever 43. The tank support weldment 12 is said to be floating, because the pivot pin 31 is allowed to move along the long length of the elongate opening 62. Thus, the hydraulic lift cylinders 18 and 19 float at the lower ends 18B and 19B thereof relative to the trailer frame 14. As described herein, the combination of the removable tank 11 and the tank support weldment 12 is described as floating about the pivot axis 23. The pointer 47 sweeps across a scale 66 inscribed on the scale face 21 in accordance with the weight of a collected crop within the removable tank 11.

In FIG. 7, the scale is shown mounted adjacent end member 33 on the trailer frame because the trailer frame 14 and tongue member 17 are configured in FIG. 4 for towing by an operator driven tractor with end member 33 at the forward end of the tow direction for trailer frame 14. As previously mentioned, the tongue anchor bracket 36 is configured to accept the towing tongue 17 in a fashion such that it extends outwardly from the opposing end member 34. In such a case the gondola assembly is towed with end member 34 at the forward end in the direction of towing. This feature facilitates towing the gondola assembly on an opposing side of a crop harvester that may dispense the harvested crop on the opposing side of the harvester. It further provides for viewing of the weight scale 66 by an operator of the tractor towing the gondola assembly when the towing is accomplished in either direction with end member 34 or end member 33 in a forward position.

Figure 11A:
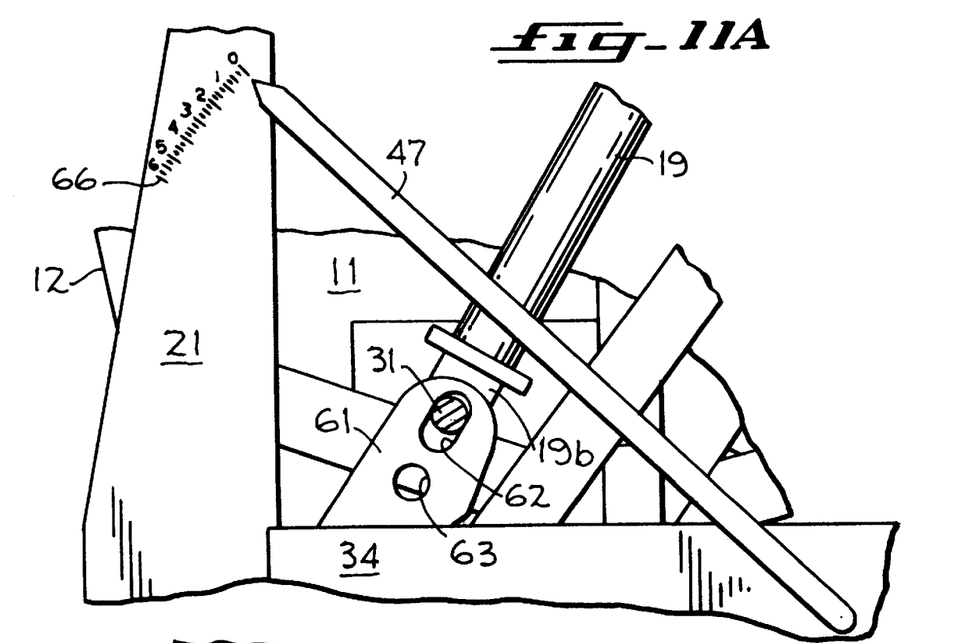
FIG. 11A is a detail showing one aspect of the floating feature in the structure of the present invention.
Figure 11B:
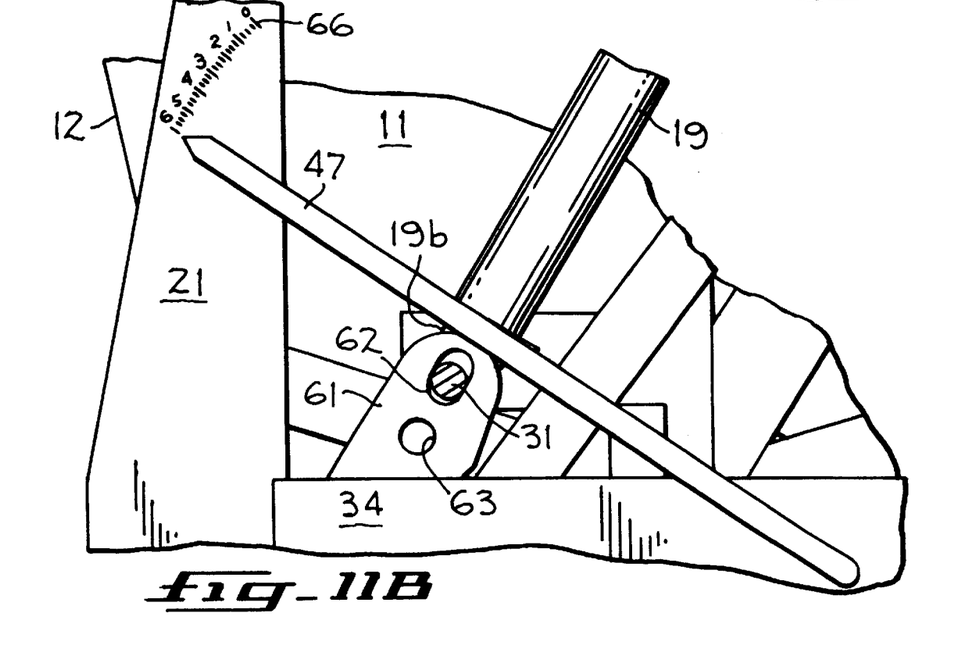
FIG. 11B is another detail showing another aspect of the floating feature in the structure of the present invention.

Note that in FIG. 11A the pointer 47 is shown indicating zero weight in the removable tank 11. The pin 31 is shown in FIG. 11A near the top end of the elongated slot 62 in the mounting bracket member 61 for the hydraulic lift cylinder 19. In contrast, FIG. 11B shows the pointer 47 at the upper portion of the scale 66 when the removable tank 11 is carrying a load of collected crop. In such a case the pivot pin 31 is seen near the bottom of the elongated slot 62 in the bracket member 61. Note that in either one of the cases of FIG. 11A or FIG. 11B, pivot pin 31 is not butted against either the upper or lower edge of the elongate slot 62. In these instances the hydraulic lift cylinders 18 and 19 are in condition with the piston rods fully retracted within the lift cylinders. The operator of the towing tractor having control over the hydraulic lift cylinders 18 and 19 therefore fully retracts the rods in the hydraulic lift cylinders for the crop collection operation as the gondola assembly is towed alongside a crop harvester to collect the crop therein. It should be noted that while the description herein has been directed toward a floating lower end of the hydraulic lift cylinders 18 and 19, that a floating upper end of the lift cylinders would accomplish the same purpose and is considered to be within the scope of the disclosed invention. At this point it should also be mentioned that when the removable tank is fully loaded and the pivot pin 31 is approaching the bottom of the elongate slot 62, the main spar 29 on the tank support weldment 12 contacts the stop 37 protruding from the inner surfaces of the frame end members 33 and 34 to prevent over load on the weighing structure seen in FIGS. 5A–5D. The stop 37 is best seen in FIGS. 4 and 5A. From the foregoing it may be seen that within the limits of the inscribed scale 66 a true weight within the removable tank 11 is measured because none of the force induced by the weight is absorbed by the cylinders themselves or by any resident friction in the cylinder packings.

Figure 10:
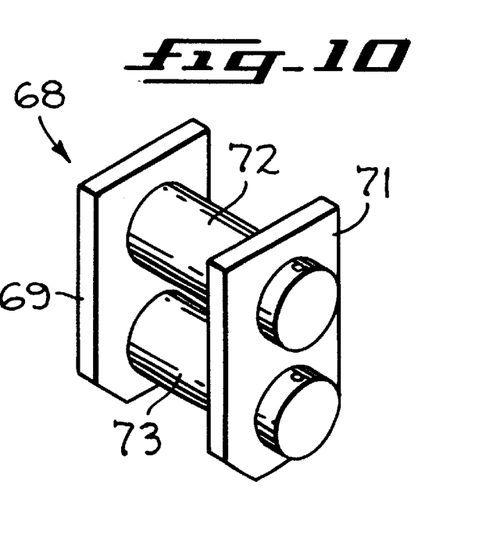
FIG. 10 is another detail showing another portion of the calibration fixture of FIG. 8.

With reference again to FIG. 8 of the drawings, a description of the manner in which the weighing structure of FIG. 5A is calibrated will be discussed. First, the pivot pin 31 that engages the lower ends 18B and 19B of the hydraulic lift cylinders and extends through the elongated hole 62 in the lift cylinder bracket members 59 and 61 is removed. A shackle assembly shown generally at 68 in FIG. 10 has as its component parts a shackle ear 69 for positioning adjacent bracket member 59 and a shackle ear 71 for positioning adjacent bracket member 61 during calibration of the weighing scale. The calibration shackle also includes an upper pin 72 extending through mating holes in shackle ears 69 and 71 and a lower pin 73 extending through another pair of mating holes in shackle ears 69 and 71. The shackle assembly 68 is installed at the lower end of each of the hydraulic lift cylinders 18 and 19 during calibration. The upper pin 72 is installed through a bore in the lower end 18B and 19B of the lift cylinders and the lower pin 73 is installed through the lower holes 63 in the cylinder brackets 59 and 61. To insert the pin 72 through the mating holes in the shackle ears and the lower end bores in the lift cylinders, the lift cylinders must be slightly extended. When the shackle assembly 68 of FIG. 10 is installed as shown in FIG. 8, the lower ends of the lift cylinders 18 and 19 are fixed relative to the trailer flame 14 so that they no longer float relative to the trailer frame and the pivot axis 23 on the trailer frame. The lift cylinders 18 and 19 are now pressurized at port 74 (FIG. 6) to force the cylinder rods downwardly as seen in the drawings, for example FIG. 4. With the cylinder rod end so pressurized it is possible to simulate a chosen load, for example a 10,000 lb. (5 ton) calibrating load. While maintaining the pressure for calibration at the rod end of the lift cylinders, coupling 51 (FIG. 5A) is loosened and the pointer 47 is moved to line up with the 5 ton mark on the inscribed scale 66. Coupling 51 is now tightened to maintain the pointer 47 in the calibrated 5 ton position and the pressure at the rod end of the hydraulic lift cylinders is relieved. The shackle assembly 68 of FIG. 10 is removed and the lower cylinder pivot pins 31 are replaced. Both cylinders are placed in fully retracted position which places the pivot pins 31 near the upper end of the elongate slot 62. With no collected crop within the removable tank 11, the pointer 47 will now point to a position on the inscribed scale 66 indicating zero load. As crop is collected within the removable tank 11 and assuming approximate linearity in the torsion rod 39, the additional weight of the collected crop pushes the roller 44 down against the torsional resistance of the torsion bar 39 causing the pointer 47 to traverse the inscribed scale 66 and to indicate the weight of the collected crop. The torsion spring 39 will continue to move in torsion until the main spar 29 bottoms out on the stops 37 as previously described. Cylinders 18 and 19 are still floating at this point. This continued floating prevents excessive stress from being applied at the upper ends 18a and 19a of the hydraulic lift cylinders caused, for example, by the gondola assembly bouncing over rough terrain.

Figure 6:
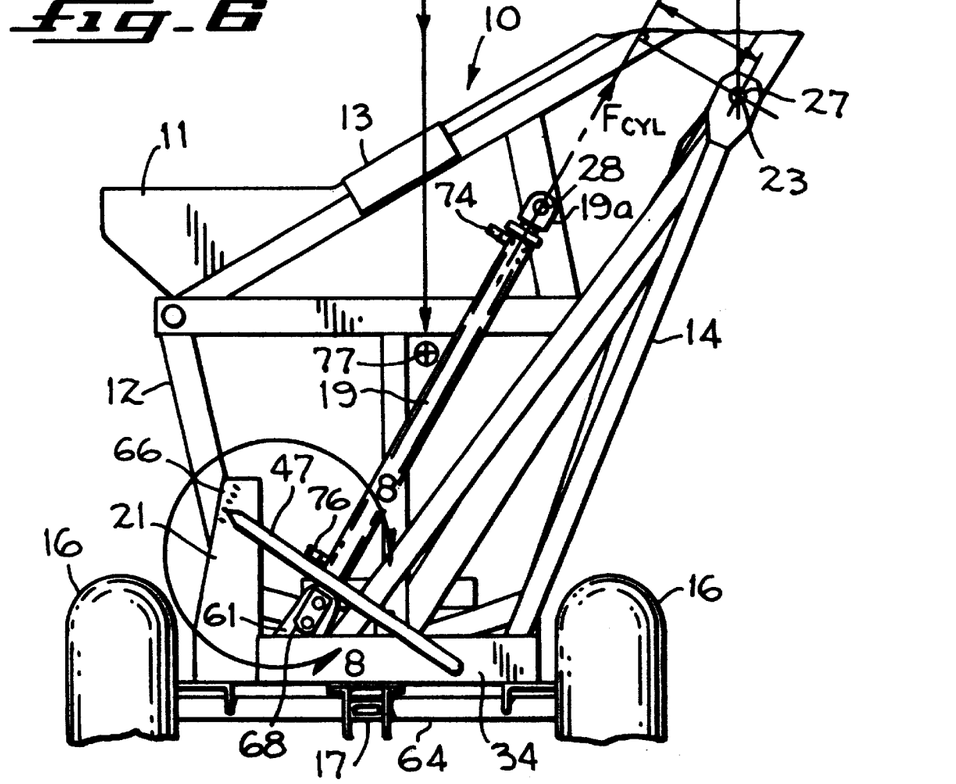
FIG. 6 is a front elevation of the crop collection gondola of the present invention.

Referring now to FIG. 6 of the drawings, an example of the aforementioned calibration procedure is described. An end view of the gondola assembly 10 is shown wherein the calibration shackle assembly 68 is installed in place of the normal operating pivot pins 31 as previously described. Hydraulic pressure is applied to a rod end port 74 while a lower end port 76 in the hydraulic lift cylinder 19 is vented to tank. A center of gravity 77 is calculated for the assembly of the removable tank 11 and the tank support weldment 12. Considering the physical dimensions of the hydraulic lift cylinders 18 and 19, a hydraulic pressure for calibration is calculated to be introduced at the upper port 74 seen in FIG. 6. The pressure to be introduced at port 74 may simulate, for example, the ten thousand pound or five-ton load referred to in the previous paragraph. For the physical characteristics of the hydraulic lift cylinders 18 and 19 used in the preferred embodiment, the calibration pressure at port 74 for producing such a load is 1127 psi. Taking into consideration the dimensional characteristics of the removable tank and the tank weldment support and summing the moments about the axis 23 the calibration pressure induces a five-ton force against the weight measurement assemblies described herein. In this example the force generated by the hydraulic lift cylinders 18 and 19 is approximately 28,770 lbs. displaced approximately 18.3 inches from the axis 27. The force sustained through the center of gravity 77 of the combination of the removable tank 11 and the tank support framework 12 is five tons at about 52.6 inches from the axis 27. These two moments being equal and summing to zero, the five-ton force is present at the weighing structure represented by any of the weighing schemes depicted in FIGS. 5A–5D. As mentioned previously, the pointer 47 is loosened from the weight sensing structure and fixed to point at the five-ton mark on the inscribed scale 66. If the scale measurement apparatus is linear, the remaining graduations in the inscribed scale 66 are determined. In the event of non-linearity in the measuring structure, various graduations on the inscribed scale 66 may be determined in the same fashion as described herein for the determination of the five-ton mark on the scale.

Figure 12A:
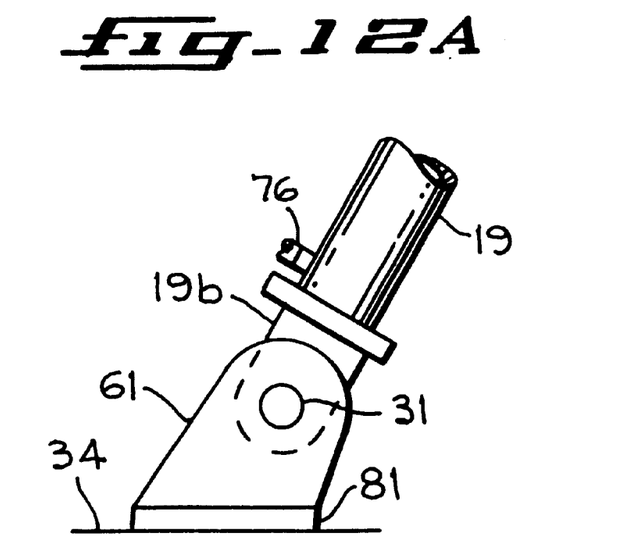
FIG. 12A is a detail showing alternative structure for weighing collected crop according to the present invention.
Figure 12B:
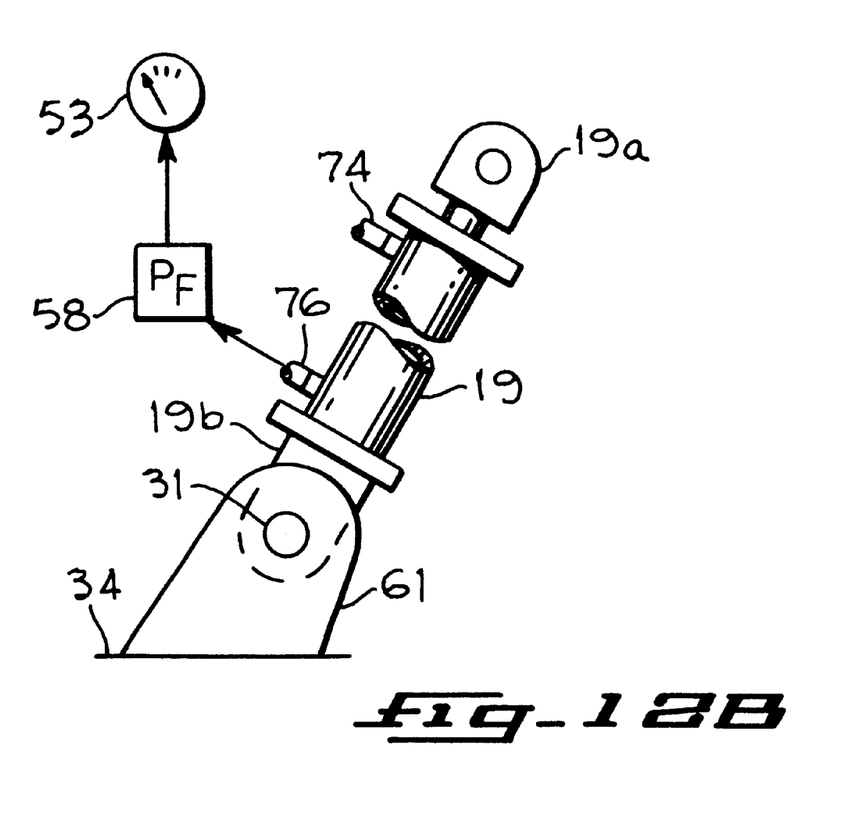
FIG. 12B is a further detail showing another structure for weighing collected crop according to the present invention.

Looking back at FIG. 1B, detail views of the areas around lower pivots 31 are shown in FIGS. 12A and 12B. These Figures depict apparatus for weighing contents of the tank 11 wherein the tank 11 and the tank weldment 12 are not floating relative to trailer frame 14, but are filly supported on trailer 14 at the lowered crop collecting position. For example, support may be provided by contact between the lower spar 29 on the tank support weldment and the stops 37 in the trailer frame end members 33 and 34. Other means for supporting the tank weldment on the trailer frame are envisioned. FIG. 12A shows a load cell 81, similar to load cell 54 in FIG. 5C, fixed between an end member (in this case end member 34) and the lower portions of bracket members 59 and 61. As described in FIG. 5C, force exerted by the weight of a collected crop within tank 11 creates an output signal from the load cell that is coupled to a gauge (similar to gauge 53) that converts the signal to weight. The weight indication can be observed in the field during crop collection by a tractor operator towing gondola 10.

FIG. 12B shows alternative structure for weighing collected crop in tank 11 during harvesting in the field. At any point in the crop collection the hydraulic lift cylinders 18 and 19 are operated to lift the tank 11 and the tank support frame off of the structure on the trailer frame 14. Pressure at port 76 in FIG. 12B is sensed and converted to weight at a gauge 53 much as in the case addressed in conjunction with FIG. 5D. Collected crop in tank 11 is thereby weighed without the need for floating the tank and tank support assembly about the pivot axis 23.

Although the best mode contemplated for carrying out the present invention has been shown and described herein, it will be understood that modification and variation may be made without departing from what is regarded to be the subject matter of the invention.

What is claimed:

1. A mobile gondola assembly for receiving a harvested crop comprising, a removable drop-in tank having an open top and a thin tank wall, at least one reinforcing rib extending along said thin tank wall, a tank support framework for carrying said removable tank, a plurality of removable clips extending between said tank open top and said tank support framework for retaining said removable drop-in tank therein, means for defining a pivot axis on said tank support framework, a mobile trailer for receiving and supporting said tank support framework for rotation about said pivot axis, means mounted between said trailer and said tank support framework for moving said tank support framework about said pivot axis between a raised dumping position and a lowered crop receiving position, and means for continuously measuring the weight of the harvested crop in said removable tank in said lowered crop receiving position.

2. The mobile gondola assembly of claim 1 wherein said mobile trailer comprises, a tongue for attaching said mobile trailer to a towing vehicle, and means for mounting said tongue alternatively on opposing ends of said mobile trailer.

3. The mobile gondola assembly of claim 1 wherein said means for continuously measuring comprises a weight indicator, and means for mounting said weight indicator alternatively for display at opposing ends of said mobile trailer.

4. The mobile gondola assembly of claim 1 wherein said means for moving comprises, a pair of hydraulic cylinders on opposing sides of said tank support framework, said pair of hydraulic cylinders each having one end thereof floating relative to said pivot axis.

5. The mobile gondola assembly of claim 4 wherein said means for continuously measuring the weight comprises, a torsion bar, means for mounting said torsion bar so that said tank support framework imparts a torque thereto corresponding to weight in said removable tank, and means for sensing said torque.

6. The mobile gondola assembly of claim 5 wherein said means for sensing comprises, mechanical means for sensing and indicating said torque, and a scale for converting said indicated torque to weight.

7. The mobile gondola assembly of claim 5 wherein said means for sensing comprises, electrical means for sensing and for providing a torque output signal, and a scale for converting said torque output signal to weight.

8. The mobile gondola assembly of claim 1 wherein said means for continuously measuring comprises, an electrical load cell mounted between said tank support framework and said mobile trailer for sensing the weight of the harvested crop and providing a force signal indicative thereof, and a scale for converting said force signal to weight.

9. The mobile gondola assembly of claim 1 wherein said means for continuously measuring the weight comprises, pressure sensing means mounted between said tank support framework and said mobile trailer for sensing pressure induced therein by the weight of the harvested crop and for providing a pressure signal indicative thereof, and a scale for converting said pressure signal to weight.

10. The mobile gondola assembly of claim 1 comprising, means for calibrating said means for continuously measuring the weight.

11. A towable gondola assembly for receiving a crop as the crop is harvested comprising, a thin walled drop-in crop receiving tank having an open top and a tank wall subject to distortion by crop loads, at least one reinforcing rib extending along said tank wall to resist distortion of the tank wall by the crop load, a framework for supporting and holding said thin walled drop-in crop receiving tank, a plurality of removable clips extending between said tank open top and said framework for retaining said tank within said framework, a trailer configured for movement over an underlying surface, means disposed between said trailer and said framework for pivotally supporting said framework for movement about a pivot axis, means for moving said framework about said pivot axis between a raised dumping position and a lowered crop receiving position, said last named means having one end thereof floating relative to said pivot axis, and a scale for indicating the weight of the crop within said receiving tank in said lowered crop receiving position.

12. The towable gondola assembly of claim 11 wherein said scale comprises, a torsion bar having a fixed end mounted to said trailer, a lever arm attached at one end to and spaced from said fixed end of said torsion bar, said framework being in contact with said lever arm at a point therealong spaced from said torsion bar, and means for detecting torque imparted to said torsion bar by the weight of the crop within said receiving tank.

13. The towable gondola assembly of claim 12 wherein said means for detecting comprises, a pointer attached to said torsion bar at a position therealong spaced from said fixed end, and a series of weight graduations adjacent said pointer.

14. The towable gondola assembly of claim 12 wherein said scale comprises, electrical means for detecting torque and for providing a torque indicative output, and an indicator for receiving said torque indicative output and for converting said torque indicative output to weight.

15. The towable gondola assembly of claim 11 wherein said scale comprises, an electrical load cell mounted between said framework and said trailer for sensing the weight of the received crop and for providing a force signal indicative thereof, and indicating means for converting said force signal to weight.

16. The towable gondola assembly of claim 11 wherein said scale comprises, pressure sensing means mounted between said framework and said trailer for sensing pressure induced therein by the weight of the received crop and for providing a pressure signal indicative thereof, and indicating means for converting said pressure induced to weight.

17. The towable gondola assembly of claim 11 further comprising, means for calibrating said scale.

18. The towable gondola assembly of claim 11 wherein said trailer comprises, a tongue for connecting said trailer to a towing vehicle, and means for mounting said tongue alternatively on opposing ends of said trailer.

19. The towable gondola assembly of claim 12 wherein said scale comprises means for mounting said torsion bar, said lever arm and said means for detecting torque alternatively at opposing ends of said trailer.

20. The towable gondola assembly of claim 11 wherein said scale comprises, a weight sensor providing an output indicative of weight, a gauge for receiving said output indicative of weight and converting said output to a weight display, and means for mounting said gauge alternatively to opposing ends of said trailer, whereby said gauge is viewable from a predetermined end of said trailer.

21. A towable gondola assembly for collecting a crop load from a crop harvester as the crop is harvested, a lightweight, thin wall crop collecting vessel having an open top and a vessel wall subject to distortion by the crop load, at least one reinforcing rib extending along said vessel wall to resist distortion by the crop load, a framework for securely holding and supporting said lightweight thin wall vessel, a plurality of removable clips extending between said vessel open top and said framework for retaining said vessel within said framework, a trailer for supporting said framework, means for mounting said framework on said trailer for pivoting movement about a pivot axis, means for moving said framework about said pivot axis between an elevated crop dump position and a lowered crop collecting position, said means for moving having one end thereof floating in the crop collecting position relative to said pivot axis, and means for sensing and indicating the weight of the collected crop in the lowered crop collecting position during crop collection, whereby known weight of harvested crop is transferred in the elevated dump position.

22. The towable gondola assembly of claim 21 wherein said means for sensing and indicating comprises, mechanical means.

23. The towable gondola assembly of claim 21 wherein said means for sensing and indicating comprises, electrical means.

24. The towable gondola assembly of claim 21, wherein said means for sensing and indicating comprises, hydraulic means.

25. The towable gondola assembly of claim 21 comprising, a towing tongue, and means for mounting said towing tongue alternatively on opposing ends of said trailer, whereby said trailer is towable on alternative sides of the crop harvester.

26. The towable gondola assembly of claim 25 wherein said means for sensing and indicating the weight comprises, means for mounting said means for sensing and indicating alternatively on either end of said trailer, whereby weight of the collected crop is viewable from a forward end of said trailer when towed on either side of the crop harvester.

27. A method of collecting a harvested crop in a field from a crop harvester, comprising the steps of towing a crop collection gondola along one side of the crop harvester, pivoting a removable open top tank about a pivot axis to a lowered crop collection position, collecting the harvested crop in the removable open top tank while the tank is in the lowered collecting position, floating the tank relative to the gondola pivot axis during crop collection, continuously monitoring the weight of the collected crop in the removable tank, while the crop is collected, and raising the removable tank about the pivot axis to a raised dump position for transferring collected crop after obtaining a predetermined weight of the collected crop, wherein the crop collection gondola is attached by a towing tongue on the gondola to a towing tractor comprising the steps of, removing the towing tongue from one end of the gondola, attaching the towing tongue to the opposing end of the gondola, and towing the crop collection gondola along a side opposite to the one side of the crop harvester.

28. The method of collecting a harvested crop as in claim 27 wherein a weight gauge is provided for the step of continuously monitoring the weight, comprising the steps of removing the weight gauge from one end of the gondola, and attaching the weight gauge to the opposing end of the gondola, whereby the weight gauge is visible to a towing tractor operator.

* * * * *